2,767,178
Patented Oct. 16, 1956

2,767,178
METHOD FOR THE PREPARATION OF NITRITES OF ORGANIC AMINES

Charles Mellick, Chicago, Ill., assignor to Dearborn Chemical Company, Chicago, Ill., a corporation of Illinois No Drawing. Application January 14, 1952,
Serial No. 266,450

5 Claims. (Cl. 260—247)

This invention relates to an improved method for preparing nitrites of organic amines, and more particularly, for preparing dicyclohexylammonium nitrite.

Certain nitrites of organic amines, and particularly, dicyclohexylammonium nitrite, have been found to be useful as highly effective vapor phase inhibitors of corrosion, as lubricating oil additives, as components of protective organic coatings for metal surfaces such as pipe lines and as corrosion inhibitors in wax formulations and the like. Such compounds may form a component of microcrystalline wax laminations used in certain government wrappers, particularly in the wax coatings on the interior of packages, or in the coating of wrappers adjacent metal surfaces to effectively inhibit corrosion of the metal.

In U. S. Patents No. 2,449,962 and No. 2,544,245, issued to Aaron Wachter and Nathan Stillman, it is suggested that dicyclohexylammonium nitrite may be prepared by carrying out two reaction steps which include, first, reacting dicyclohexyl amine with a suitable inorganic acid such as phosphoric acid so as to form an inorganic salt of the amine, and then reacting that salt with a nitrite salt, such as sodium nitrite. It was well known in the art that the direct reaction of nitrous acid with a secondary amine results in the formation of a nitrosamine, according to E. Wertheim "Organic Chem.," p. 311.

The Wachter et al. process leaves much to be desired in that it necessarily results in the formation of a sodium salt of the particular inorganic acid used to form the amine salt, obtained in the first of said reaction steps. The sodium salt, being soluble in water, tends to contaminate the "organic ammonium nitrite" product, thereby necessitating an additional purification step.

In accordance with the present invention, a nitrite of an organic amine is formed by bringing together, in the presence of an inert solvent and at an alkaline pH, ammonium nitrite and the desired organic amine, so as to form ammonia and the organic ammonium nitrite product. Since the ammonia is allowed to escape as a gas, the resulting reaction mixture contains no by-products of the reaction, thereby avoiding any additional purification step.

It is, therefore, an important object of the instant invention to provide a method for the production of an organic ammonium nitrite whereby no by-products are retained in the initial reaction mixture.

It is a further object of the instant invention to provide a method for preparing a nitrite of an organic amine that is greatly simplified and reduced in expense.

It is another object of the instant invention to provide a method for preparing a nitrite of an organic amine wherein no purification steps of the organic ammonium nitrite reaction product are required.

It is still a further object of the instant invention to provide a method that comprises bringing together, in the presence of an inert solvent and at an alkaline pH, ammonium nitrite and an organic amine to form ammonia and a nitrite of the organic amine.

It is still another object of the instant invention to provide a method wherein ammonium nitrite and a non-acid reacting organic amine are brought together in the presence of water, as the sole reactants involved, under such conditions that free ammonia may escape from the reaction mixture.

It is yet a further object of the instant invention to provide a method whereby an organic ammonium nitrite corrosion inhibitor can be produced in a carrier medium, such as paper, in situ, by passing a continuous web of paper—first, through one reagent solution and then through a second reagent solution, whereupon reaction takes place, leaving the desired amine nitrite reaction product absorbed within the paper to produce, upon drying, a suitably treated finished product.

The reaction which is believed to take place in carrying out a preferred embodiment of the instant invention may be represented by Equation I below:

(1)
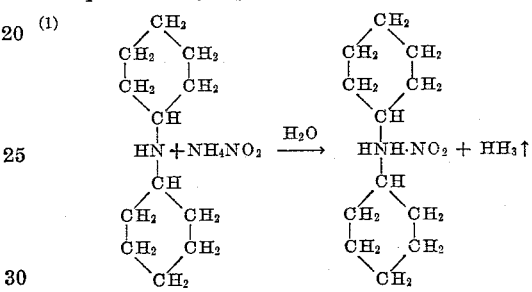

wherein dicyclohexylamine is reacted with ammonium nitrite in the presence of water, as an inert solvent, to form dicyclohexylammonium nitrite and ammonia, which latter escapes as a gas. A simplification of the instant reaction may be represented as is shown in Equation 2 below:

(2)
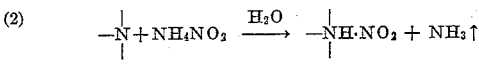

wherein

represents the reactive amine nitrogen.

The preferred solvent for use in the instant invention is water. However, other solvents may be used. In general, the solvent which is to be used must be inert with respect to ammonium nitrite, the free ammonia by-product, and the organic amine. Such a solvent should also have the normal solvent properties making it suitable for commercial use, such as relatively low volatility at the normal reaction temperatures. Preferably, the solvent dissolves ammonium nitrite readily. On the other hand, it is not necessary that the solvent be completely miscible with the organic amine reactant, or that it be capable of dissolving readily the organic ammonium nitrite product. In general, it is preferable that the solvent has low solubility for either the organic amine or the amine nitrite, or both.

In an ideal reaction system for the instant invention, a liquid organic amine is only slightly miscible in the (water) solvent, for example, being soluble in or miscible with the solvent to the extent of about 1%–10% of the weight of the solvent. Also, it is preferred that the amine nitrite product be substantially insoluble in the solvent, in such situations in which it is desired to obtain an organic ammonium nitrite in substantially pure form in the absence of a solvent. In such situations, the organic amine will appear as a separate layer upon the water until it has dissolved and reacted, whereupon the organic ammonium nitrite reaction product will precipitate from the water.

In carrying out the process of the instant invention, it is desirable to maintain the reaction temperature at below about 80° C. and it is ordinarily desirable to carry out the reaction between about 0° C. and about 60° C., preferably, about 20–50° C. One of the unique advantages of the instant invention resides in the fact that it may be carried out at room temperature, since the heat of reaction is ordinarily not sufficient to necessitate an appreciable extent of cooling if the reaction is carried out at room temperature, and the ammonia by-product tends to free itself readily from a reaction mixture at such a temperature in the presence of the preferred solvent, water.

The process of the instant invention is, of course, preferably carried out under atmospheric pressure. In any event, the pressure must be such that the release of ammonia from the solvent is not unnecessarily impaired. In some instances it might be advisable to use a slightly elevated pressure in order to effectively retain some volatile organic amines in the reaction mixture. On the other hand, it may be desirable in other instances to carry out the reaction under slightly reduced pressures in order to accelerate the release of ammonia from the reaction mixture.

In general, the properties of organic amines, from a physical point of view, vary substantially. The lower molecular weight amines are relatively volatile compounds having properties similar to ammonia. The extremely high molecular weight amines are solids under standard conditions. However, most of the amines currently available are liquids at standard conditions (i. e., 0° C.), having a relatively low density. The solubility of such compounds in water, in general, decreases with increases in the molecular weight. An organic amine that is used in the instant process should be less volatile than ammonia under the reaction conditions so that the tendency will be to drive away the ammonia by-product and to retain the organic amines until it has been reacted. On the other hand, the organic amines should be of sufficiently low molecular weight to be capable of dissolving in the reaction solvent to such an extent that an appreciable rate of reaction may be effected. In other words, it should be capable of forming at least a one weight percent solution in the solvent, and such is the case with the normally liquid amines. It will be appreciated that the particular extent to which the amines should be soluble in the solvent is merely that which is sufficient to permit an appreciable concentration of the amine in the solution so that reaction therewith may be taking place to an appreciable extent.

In general, the organic amine must be a compound wherein the organic radical is substantially inert with respect to the solvent and with respect to ammonium nitrite. In other words, for the purposes of the instant invention, the organic radical should not be such that it tends to interfere with the principal reaction by reacting with any of the ingredients present. Preferably, the organic radical is a hydrocarbon radical.

The organic amine, which may be used in the preferred practice of the instant invention, may be a mono- or a polyamine, of course; preferably, it has the following general formula:

wherein $x$ and $y$ are each integers from 1 to 3 and each R is an organic radical whose valence is $x$, the total number of R's being $y$ and the total number of organic radical valences being $xy$, and equaling not more than 3. Since the compound is an "amine" the N atom therein is attached by, preferably, single bonds only to carbon (and/or hydrogen) atoms, and R, if it is a polyvalent radical, has its free valences attached to a plurality of different carbon atoms, thereby excluding such atoms as the amido, imido and nitrite N atoms from the scope of the instant N atom. Accordingly, the organic amine may be a "cyclic" amine such as morpholine and cyclohexylamine. The organic amine may be a so-called "aliphyl" or non-aromatic amine, i. e., an aliphatic or cycloaliphaticamine, such as octylamine, isopropylamine, and cyclohexylamino, or it may be a "heterocyclic" amine such as morpholine.

It has been found that the organic radicals preferred for use in the instant invention are monovalent hydrocarbon radicals having from 1 to 18 carbon atoms, and most preferably from 3 to 8 carbon atoms. Also, it is preferred that such hydrocarbon radicals be saturated aliphyl hydrocarbon radicals such as propyl, octyl and cyclohexyl radicals.

The organic radical R may be divalent, for example, if $x$ is equal to 2 and $y$ is equal to 1, as is in the case of morpholine; or the organic radical R may be monovalent as, for example, in the case of the octyl-radical, whereupon $y$ may be 1, 2 or 3. Preferably, the amine is a primary or secondary amine; and, most preferably, the organic radical is monovalent and the particular amine employed is a secondary amine, i. e., having 2 monovalent organic radicals attached to amine nitrogen. The organic amine particularly preferred is a cyclohexylamine having at least one hydrogen and at least one cyclohexyl radical attached to the amine nitrogen atom. Such a compound may be represented, as follows:

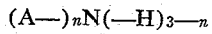

wherein A is a cyclohexyl radical and $n$ is an integer from 1 to 2. The most useful product of the instant invention is dicyclohexylammonium nitrite and, accordingly, dicyclohexylamine is most preferred for use in the instant invention.

Other amines which may be used in the practice of the instant invention include propylamine, isopropylamine, diisopropylamine, butylamine, isobutylamine, secondary-butylamine, tertiary-butylamine, dibutylamine, diisobutylamine, amylamine, isoamylamine, secondary-amylamine, tertiary-amylamine, diisoamylamine, tripropylamine, tributylamine, triisobutylamine, hexylamine, heptylamine, dodecyl amine, cetyl amine and octadecyl amine. In certain instances, the process of the instant invention finds unique advantage in its ability to produce substantially pure and uncontaminated high molecular weight amines, i. e., those having 9–18 carbon atoms contained in from one to two organic radicals, and preferably only one radical. Preferably, the total number of carbon atoms in a hydrocarbonamine suitable for use in the instant invention does not exceed 12 carbon atoms, and in the case of alkylamines, does not exceed 8 carbon atoms. As hereinbefore mentioned, the solubility of the instant amine in the reaction solvent is the primary consideration in this respect.

In carrying out the process of the instant invention, preferably an aqueous ammonium nitrite solution is first prepared containing from about 5% of its weight of ammonium nitrite to an amount of ammonium nitrite sufficient to saturate the solution. Under ordinary operating conditions about a 10–20 weight percent aqueous ammonium nitrite solution is most suitable. The organic amine is then brought into contact with the ammonium nitrite, in aqueous solution, in approximately equal molecular proportions. The particular proportions used are unimportant unless it is desired to replace completely all of the ammonium nitrite in solution with an amine nitrite, for example, so as to carry the reaction to substantial completion. The reaction itself is understood to take place in equal molecular proportions (for each amine N in the organic amine), so in order to carry out the reaction in the most practical way it is preferable to bring the ammonium nitrite and the organic amine together in substantially equal molecular proportions. After the reactants have been brought together, ordinarily it is necessary to agitate the reaction mixture because many of the organic amines are not completely miscible with water.

More specific details of the instant process are set forth in the following examples:

Example I

A charge of 45.3 g. of dicyclohexylamine was added slowly to a suitable vessel containing 114 g. of 18 weight percent aqueous ammonium nitrite, with stirring over a period of ¼ of an hour. The addition of the charge resulted in immediate precipitation of a white solid dicyclohexylammonium nitrite, and the simultaneous liberation of gaseous ammonia. During such addition, the reaction temperature increased from a starting room temperature of about 25° C. to 35° C. and no cooling or other attention was required. After all the amine charge had been introduced into the reaction vessel, the reaction mixture resulting was a paste-like material, which was stirred vigorously at room temperature for ¾ of an hour. Then a charge of 50 cc. of water was added to increase the fluidity of the mass, and the resulting mass was filtered and the product remaining on the filter air-dried overnight. The resulting product was dicyclohexylammonium nitrite, which was obtained in a conversion yield of 94.5%, based on the dicyclohexylamine used.

It will be appreciated that in instances in which the organic ammonium nitrite product is soluble in water and does not, therefore, precipitate during the reaction, the water may be removed readily therefrom by ordinary drying processes so as to obtain a substantially pure reaction product.

Example II

A charge of 0.25 mole of a branched chain aliphatic amine (tertiary-octylamine) is added to a suitable vessel containing 0.28 mole of ammonium nitrite in an 18 weight percent aqueous solution, with stirring which is continued for a period of four hours. During that time, the water-immiscible amine dissolves in the reaction mixture, by vacuum concentration, while crystals of octylammonium nitrite are obtained from the reaction mixture.

If a reaction is carried out that is the same as the foregoing reaction except that an equivalent amount of nonyl or dodecylamine is reacted with the ammonium nitrite the results obtained are substantially the same as those just described, obtaining the corresponding alkyl ammonium nitrite.

Example III

A charge of 50.5 g. of diisopropylamine is added to a reaction mixture in a suitable vessel containing 228 g. of 18 weight percent ammonium nitrite aqueous solution, with stirring. Within five minutes of stirring, the water-insoluble amine dissolves in the reaction mixture, but the stirring is continued for two hours at room temperature. The resulting reaction mixture is an aqueous solution of diisopropylammonium nitrite, which is separated from the water by conventional vacuum concentration.

Example IV

A charge of 49.5 g. of monocyclohexylamine is added to a reaction vessel containing 228 g. of an 18% ammonium nitrite aqueous solution, with stirring. The stirring is continued at room temperature and at 5–10° C. above room temperature for a total of 2–4 hours. The resulting product is an aqueous solution of monocyclohexylammonium nitrite, which is crystallized from the aqueous solution by vacuum concentration to isolate the product.

Example V

A charge of 43.5 g. of morpholine is added to a reaction vessel containing 228 g. of 18 weight percent ammonium nitrite aqueous solution, with stirring. The stirring is continued at room temperature and at temperatures 5–10° C. thereabove for 2–4 hours. At the end of that time, the reaction mixture so obtained is an aqueous solution of morpholine nitrite. Crystalline morpholine nitrite is isolated therefrom by conventional vacuum concentration.

If a reaction is carried out that is the same as the foregoing reaction except that a tertiary or quaternary amine such as triisopropyl amine or tetraethyl ammonium hydroxide, respectively, is reacted with the ammonium nitrite to obtain the corresponding alkylammonium nitrite, substantially the same results are obtained.

In general, the instant reaction may be carried out employing any amine which, by virtue of the reactivity of the amine grouping therein, is more strongly basic than ammonia. The product accordingly obtained may have the following general formula, for example:

wherein $z$ is an integer from 1 to 4 and B is an alkyl radical, which may or may not be joined to another alkyl radical by, for example, an ether linkage at the outer extremity of each as in the morpholine structure.

Expressed in other terms, the reacting amine may have the following generic formula, in its hydrated form:

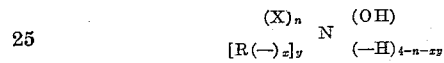

wherein R, $x$ and $y$ have the meanings hereinbefore described; and X may be H or an alkyl radical and $n$ is one or zero. Such an amine (hydrated) would include quaternary amines such as tetraethyl ammonium hydroxide, which is well known as an extremely basic compound.

Another particularly advantageous feature of the instant invention resides in the fact that a substantially pure aqueous solution of certain of the amine nitrite reaction products may be obtained in the initial reaction mixture, merely by carrying out the reaction employing substantially equal molecular proportions of ammonium nitrite and the organic amine. For example, in the reaction producing dicyclohexylammonium nitrite, the reaction mixture contains only water, the desired nitrite, ammonium nitrite and residual dicyclohexylamine; and of all those ingredients the desired nitrite is the least volatile, and it can, therefore be obtained as an essentially uncontaminated product merely by evaporating off all the other ingredients. In contrast, all of the previously known procedures of the art involved the formation of non-volatile salt by-products such as sulphates, chlorides or phosphates, which not only result in expensive material losses but also result in the presence in the nitrite of such fatally defective contaminants as the sulphates and chlorides which are corrosion promoters.

It should also be mentioned that it is ordinarily preferable to carry out the instant reaction employing a slight excess of ammonium nitrite, for example, a 5–15 mole percent excess over equal molecular proportions. The slight excess is useful in that it assures the maintenance of a distinctly alkaline pH in the reaction mixture. The amine employed is a non-acid reacting compound vis a vis the aqueous solution, in that it contains no "acid" radicals or groups which would tend to impart an acid pH to the aqueous solution. Such is a general characteristic of organic amines, particularly those whose organic substituents are hydrocarbon radicals, or at least radicals wherein any atoms other than C and H are O atoms in ether linkages (e. g., morpholine), whether cyclic or aliphatic ether linkages.

In the instant invention, in some instances the resulting reaction mixture contains the organic ammonium nitrite in solution, which is a substantially pure solution thereof. That solution may be used directly, for example, in the impregnation of a paper base for a desired purpose.

Also, since no by-products are prepared which remain in solution at the end of the instant reaction, it is possible to carry out the instant reaction in the presence of a material such as paper which is to be treated by the organic ammonium nitrite product, whether or not it is essentially insoluble. For example, a traveling paper web may be passed through first, a suitable ammonium nitrite solution, say, of 10 to 20% by weight, so as to impregnate the paper web therewith, and then through a bath comprising the desired organic amine reactant, or a suitable solution thereof. It will be appreciated that in carrying out such a process the time of travel in the organic amine bath may be used to determine the extent and the amount of impregnation of the paper web. By the use of such a reaction procedure, the organic ammonium nitrite is formed in situ and the paper web may thus be impregnated by various water-insoluble as well as soluble organic ammonium nitrites, which would be formed upon penetration of the web by the particular organic amine. If the web is first impregnated with aqueous ammonium nitrite and dried, then it may be immersed in an organic amine bath having therein, for example, water to effectively dissolve the ammonium nitrites so as to bring about reaction with the amine.

The particular advantage of the instant process resides in the fact that it may be carried out employing an organic amine in the absence of any salt of the amine other than the nitrite salt which is a product of the reaction. Accordingly, no salt by-products are formed which would have to be separated from the amine nitrite product in order to obtain a pure product.

While the specification discloses and describes in considerable detail preferred embodiments of the invention, it should be understood that the invention is susceptible of variations and modifications within the scope of the appended claims.

I claim as my invention:

1. A process of preparing an organic ammonium nitrite, which comprises reacting at 0°–80° C. in aqueous solution ammonium nitrite and an amine, as the free base, selected from the group consisting of alkylamines, cycloalkylamines and morpholine.

2. A process of preparing an organic ammonium nitrite, which comprises reacting at 0°–80° C. in aqueous solution ammonium nitrite and an alkylamine, as the free base.

3. A process of preparing an organic ammonium nitrite, which comprises reacting at 0°–80° C. in aqueous solution ammonium nitrite and a cycloalkylamine, as the free base.

4. A process of preparing an organic ammonium nitrite, which comprises reacting at 0°–80° C. in aqueous solution ammonium nitrite and morpholine, as the free base.

5. A process of preparing an organic ammonium nitrite, which comprises reacting at 0°–80° C. in aqueous solution ammonium nitrite and dicyclohexylamine, as the free base.

References Cited in the file of this patent

UNITED STATES PATENTS

| | | |
|---|---|---|
| 1,593,296 | Fues | July 20, 1926 |
| 1,842,711 | Birchall et al. | Jan. 26, 1932 |
| 2,449,962 | Wachter et al. | Sept. 21, 1948 |
| 2,457,048 | Kyrides et al. | Dec. 21, 1948 |
| 2,544,245 | Wachter et al. | Mar. 6, 1951 |
| 2,635,116 | Wolfe | Apr. 14, 1953 |
| 2,710,243 | Swimmer | June 7, 1955 |